(12) United States Patent
O'Rourke et al.

(10) Patent No.: US 8,322,231 B1
(45) Date of Patent: Dec. 4, 2012

(54) HYDROSTATIC FORCE/DISPLACEMENT MEASURING DEVICE

(75) Inventors: Jack R. O'Rourke, Panama City, FL (US); Robert L. Peebles, Panama City, FL (US); Danny L. Smith, Panama City, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 349 days.

(21) Appl. No.: 12/800,820

(22) Filed: May 4, 2010

(51) Int. Cl.
*G01L 1/02* (2006.01)
(52) U.S. Cl. .............................. 73/862.581; 73/862.584
(58) Field of Classification Search ............. 73/862.581, 73/862.584
See application file for complete search history.

(56) References Cited

U.S. PATENT DOCUMENTS

| | | | | |
|---|---|---|---|---|
| 2,051,042 A | * | 8/1936 | Hendel et al. | 73/146 |
| 3,372,764 A | * | 3/1968 | Crotts | 177/208 |
| 4,537,266 A | * | 8/1985 | Greenberg | 177/208 |
| 5,117,373 A | * | 5/1992 | Huff | 702/173 |

* cited by examiner

*Primary Examiner* — Lisa Caputo
*Assistant Examiner* — Jonathan Dunlap
(74) *Attorney, Agent, or Firm* — James T. Sheperd

(57) ABSTRACT

A hydrostatic force/displacement measuring device measures the force and displacement exerted by a rotating tire in soil/aggregate. The measuring device has a hydrostatic actuation assembly having a pressure plate at near surface depths of soil/aggregate to provide hydrostatic pressures in a liquid representative of force and displacement created by the downward forces exerted by a rotating tire in the soil/aggregate at the near surface depths. A hydrostatic hose transmits the hydrostatic pressure forces in the liquid to a surface manifold assembly. The surface manifold assembly receives the hydrostatic pressure forces and has a gauge providing visual readouts of the hydrostatic pressure forces representative of the downward forces. The surface manifold assembly also has an axially displaceable piston defining an interface chamber. The piston is connected to an electronic sensor to provide visual readouts representative of displacements caused by the downward force.

15 Claims, 3 Drawing Sheets

HYDROSTATIC FORCE/DISPLACEMENT MEASURING DEVICE

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION

This invention relates to measuring force and displacement exerted by a tire. More particularly, the invention is for a device and method for measuring and characterizing the force and displacement exerted by a rotating tire through near surface depths in different soil/aggregate compositions that could detonate a buried explosive charge.

Currently, a most dangerous weapon encountered by operational forces is the Under Vehicle, Victim Operated Improvised Explosive Device (VOIED). This devastating weapon-of-choice accounts for considerable injuries and fatalities of both military forces and local civilians alike.

Typically, a VOIED has a main explosive charge connected to a mechanically actuated triggering mechanism that are both buried under a roadway. The triggering mechanism is actuated when the tires or tracks of a vehicle depress a pressure plate a predetermined distance to initiate detonation of the main charge.

Today's adversary combines imagination with limited available resources to arbitrarily construct a triggering mechanism that usually has a mechanically displaceable pressure plate connected to a wide selection of different items on hand. Consequently, there is little to no consistency in the designs of the encountered trigger mechanisms, or, as otherwise stated, "no two triggers are identical." This lack of consistency increases the complexity of developing standard countermeasures.

Current countermeasure test initiatives to combat the problem of VOTED conduct go/no-go functionality testing against simulated devices. But, because of the lack of repeatability in trigger design, the current initiatives reduce the confidence placed on go/no-go testing. Another complication arises in that the simulated trigger of today will most likely be different than the one encountered tomorrow. Rather than react to the constantly changing threat, military tacticians and planners need to counter the threats with proactive/insightful means to develop vehicle threat profiles, estimate countermeasure capabilities, and provide vital insight into the soil dynamics for varying conditions (e.g. different types of aggregate, speeds and weight of vehicles, etc.).

Thus, in accordance with this inventive concept, a need has been recognized in the state of the art for a hydrostatic force/displacement measuring device capable of measuring and characterizing the force and displacement exerted by rotating tires in different soil/aggregate compositions in near-surface depths.

SUMMARY OF THE INVENTION

The present invention provides a hydrostatic force/displacement measuring device to measure the force and displacement exerted by a rotating tire in soil/aggregate. The measuring device has a hydrostatic actuation assembly having a pressure plate at near surface depths of soil/aggregate to provide hydrostatic pressures in a liquid representative of force and displacement created by the downward forces exerted by a rotating tire in the soil/aggregate at the near surface depths. A hydrostatic hose transmits the hydrostatic pressure forces in the liquid to a surface manifold assembly. The surface manifold assembly receives the hydrostatic pressure forces and has a gauge providing visual readouts of the hydrostatic pressure forces representative of the downward forces. The surface manifold assembly also has an axially displaceable piston defining an interface chamber. The piston is connected to an electronic sensor to provide visual readouts representative of displacements caused by the downward forces at near surface depths in the soil/aggregate. The surface manifold assembly further has a spring constant cylinder containing an internal chamber coupled to the interface chamber and has an axially displaceable piston to define the internal chamber. A valve extends through the spring constant cylinder and into the internal chamber to selectively feed gas to and from the internal chamber to selectively increase and decrease its internal gas pressure, and a shaft axially extends from the displaceable piston where a pair of lock members engage the axially extending shaft to selectably fix the volume of the internal chamber in the spring constant cylinder. The electronic sensor has a potentiometer with a sliding contact mechanically coupled to the axially displaceable piston to provide the visual readouts representative of displacements caused by the rotating tire. The valve enables the selective transfer of pressurized gas to and from the internal chamber of the surface manifold assembly, and the lock nuts enable the selective engagement of the axially displaceable shaft of the spring constant cylinder to create a visual readout in the electronic sensor that corresponds to a distance of displacement of a predetermined trigger mechanism at the force indicated on the read-out gauge.

An object of the invention is to provide an apparatus to measure and characterize the force and displacement exerted by a rotating tire through near-surface depths of the ground between 1 to 12 inches in varying soil conditions.

Another object of the invention is to provide an apparatus for developing dynamic characterization profiles for vehicles traveling over the ground under varying conditions.

Another object of the invention is to provide planners and tacticians a better understanding of means for countering VOIEDS in operational environments.

Another object of the invention is to provide a relatively low cost, portable and expendable hydrostatic force/measuring device that would eliminate the need to expose personnel in the field to make such determinations.

Another object of the invention is to provide vehicle and countermeasure dynamic profiles with environmental conditions (soil dynamics) and the projected threat profiles (anticipated threat) to enable better prediction of operational threat levels, identification of possible mission impact, and determination of measures to reduce, eliminate or counter the threat of VOIEDS.

Another object of the invention is to provide an apparatus to collect soil dynamic and vehicle/countermeasure profile characterization data to provide vital insight in forecasting mission vehicle threat levels.

These and other objects of the invention will become more readily apparent from the ensuing specification when taken in conjunction with the appended claims.

DESCRIPTION OF THE PREFERRED EMBODIMENT

Figure 1:
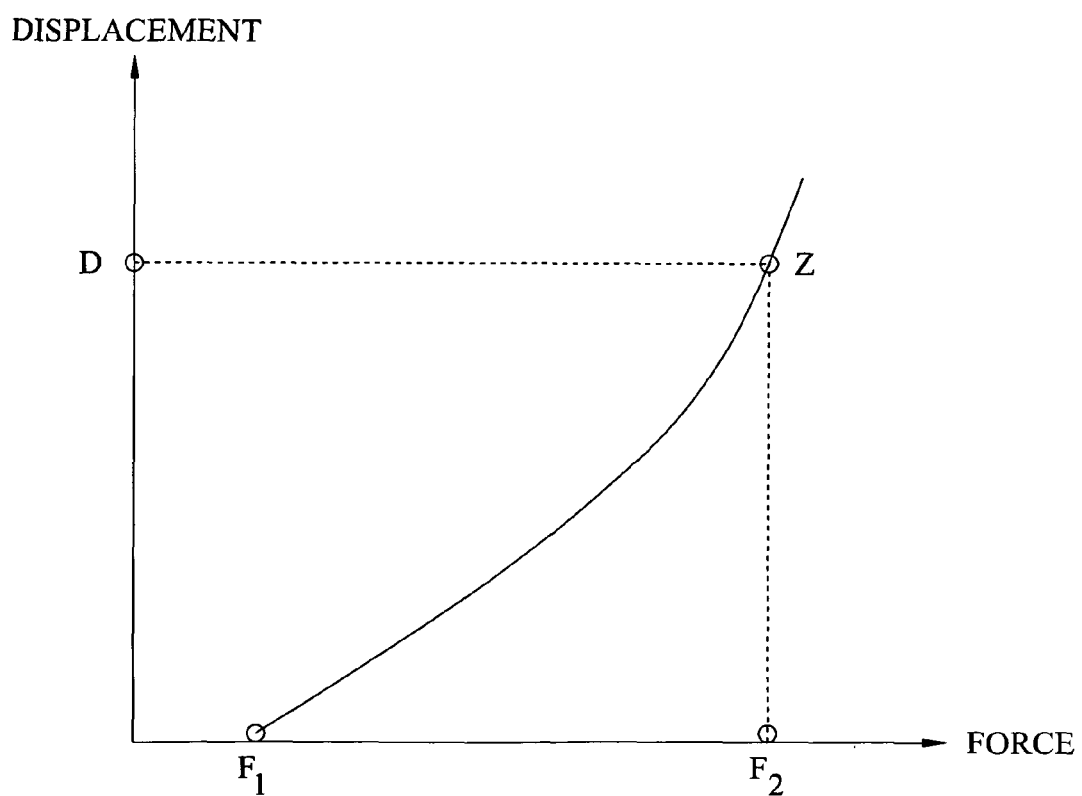
FIG. 1 is an exemplary depiction of the force/displacement function or spring resistance of a typical basic pressure plate trigger mechanism of a threat VOIED in the near-surface depths of soil/aggregate compositions.
Figure 2:
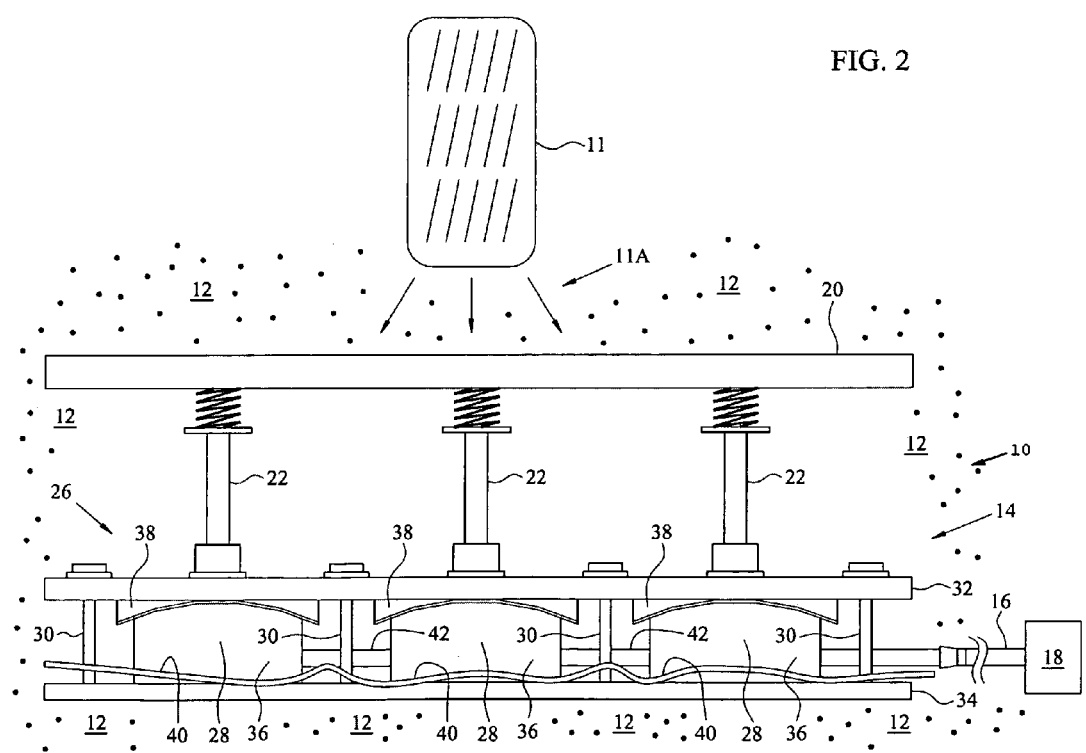
FIG. 2 is a schematic diagram of the hydrostatic force/displacement measuring device of the invention showing details of the underground hydrostatic actuation assembly.

Referring to FIGS. 1 and 2, hydrostatic force/displacement measuring device 10 of the invention is capable of measuring and characterizing the force and displacement exerted by a rotating tire 11 (or track on a mechanized vehicle) in a variety of soil/aggregate compositions 12, through near-surface depths extending between 1 to 12 inches. Contemporary tests/testing systems and analysis take into account only the amount of force on a trigger mechanism that is required to initiate detonation of an interconnected explosive of a typical threat VOIED. Unlike the conventional systems and analyses, force/displacement device 10 of the invention takes into account not only the amount of detonating force but also records the amount of displacement of a pressure-plate or equivalent structure of the triggering mechanism in the characterization of the force and displacement exerted by a rotating tire. Determining and allowing for the two factors of force and displacement that are required to initiate detonation more accurately characterizes the threat of the VOIED in a variety of soil/aggregate conditions to allow more responsive measures.

In accordance with the development of force/displacement measuring device 10 of the invention it was observed that a rotating tire of a transitional vehicle or roller-type countermeasure exerts a transitional downward force. A portion of the transitional downward force is absorbed by the soil/aggregate covering and/or surrounding the trigger mechanism that is sought to be displaced by a pressure plate of a VOIED, and as a result the basic pressure plate functionality of a typical VOIED was affected by the surrounding soil. This is because the soil absorbs or redistributes the greater portion of the total downward force to possibly prevent adequate displacement of the trigger and avert mechanical contact/detonation of the VOIED. Consequently, it was discovered in the course of development of this invention that understanding the force/displacement dynamics associated with different soil/aggregates under different conditions and how they might affect detonation will prove very insightful for future analyses and designs.

The basic force/displacement function, otherwise referred to as spring resistance, of a mechanically actuated triggering mechanism of a VOIED is graphically displayed in FIG. 1. The two variables associated with this functionality are, the dependent variable displacement, shown on the ordinate, and the independent variable force, shown on the abscissa. Initial force F1 represents the force required to initiate pressure plate compression of a triggering mechanism, the compressible distance is the displacement D of the components of a triggering mechanism that are necessary to make mechanical contact Z to complete electrical contact in the triggering device, and the total force F2 is what is required to overcome the mechanical resistance of the mechanism to make the mechanical contact Z (complete compression) and cause the VOIED to detonate. The curve extending from F1 to Z is referred to as the spring resistance curve or force/displacement curve and is different for each of the differently constructed triggering mechanisms of each VOIED.

Hydrostatic force/displacement measuring device 10 of the invention includes a hydrostatic actuation assembly 14, a hydrostatic hose 16, and a surface manifold assembly 18. Measuring device 10 takes into consideration and can accommodate the forces and pressures to activate different triggering mechanisms to allow a collection of soil dynamic and vehicle/countermeasure characterization data that may be useful for further developments.

Hydrostatic actuation assembly 14 is the underground hydrostatic pressure vessel that captures, conveys, and translates the transitional forces 11A exerted by rolling tire 11 as it passes over the top of its laterally extending pressure plate 20. Pressure plate 20 is a strong, flat rigid structure (made of steel in the preferred embodiment) that transmits transitional downward forces 11A exerted by the moving tire 11. Pressure plate 20 is located at near surface depths ranging from one to twelve inches deep in the soil/aggregate material 12 of the ground. There is no soil/aggregate material 12 in the space or volume beneath pressure plate 20 that might otherwise interfere with its downward displacement. Pressure plate 20 can be resized to represent the dimension of various pressure plate threats, i.e., differently sized and/or weighted wheeled or tracked vehicles.

Figure 3:
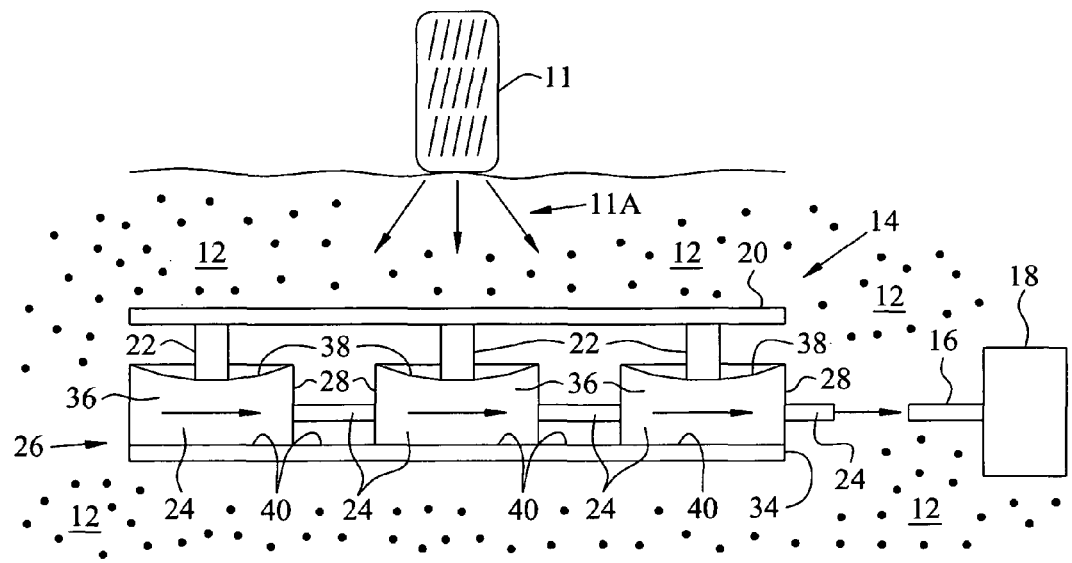
FIG. 3 is a schematic representation of the hydrostatic force/displacement measuring device of the invention shown partially in schematic cross-section to depict in greater detail constituents of the underground hydrostatic actuation assembly and forces generated during displacement of the pressure plate.

Referring also to FIG. 3, actuation assembly 14 has three rigid plungers 22 connected to the bottom of pressure plate 20 to transmit the downward transitional forces 11A to an incompressible liquid 24 inside an actuation manifold 26. The incompressible liquid can be a non-hazardous 10% dish soap and water solution to reduce environmental concerns and fluid surface tension.

Actuation manifold 26 has three hollow essentially cylindrically-shaped members 28 held in compression by a plurality of elongate bolts 30 extending through and connected to a rigid upper plate 32 (not shown in FIG. 3 for clarity) and a rigid lower or base plate 34. The three hollow members 28 define three manifold chambers 36 filled with liquid 24. Base plate 34 functions as the base of measuring device 10 and rests on soil/aggregate material 12 for measuring forces applied to hydrostatic actuation assembly 14. Like top pressure plate 20, base plate 34 is modifiable in size to represent the current threat of interest.

A high-stretch, high-abrasion latex upper membrane 38 is secured to and extends across the upper open end of each manifold chamber 36. Each latex membrane 38 is a high strength, high abrasion 800% stretchable membrane made of ⅛ inch latex which provides near-zero friction and high seal strength to reliably displace liquid 24 and thereby transmit the transitional downward force from plungers 22 to responsively pressurize liquid 24. FIG. 3 shows latex membranes 38 being downwardly deflected by plungers 22 that have been pushed downwardly by pressure plate 20 as a rotating tire 11 passes overhead and the pressurizing force is being applied to liquid 24.

The lower open end of each manifold chamber 36 has a portion of coextensive latex lower membrane 40 extending across them of essentially the same composition as upper membranes 38 to seal the lower juncture of hollow members 28 and lower plate 34 Membranes 38 and 40 between upper and lower plates 32 and 34 and hollow members 28 of actuation manifold 26 thereby contain the fluid pressures of liquid 24 that are representative of the transitional forces of tires 11. These hydrostatic pressure forces in liquid 24 are transmitted via tubular sections 42 that interconnect manifold chambers 36 and extend between hollow members 28. A hydrostatic hose 16 connected to one of the manifold chambers 28 extends to surface manifold assembly 18 having a read-out gauge 19 (see FIG. 4) to permit real time visual monitoring of these hydrostatic pressure forces associated with the effects of soil/aggregate interactions.

Figure 4:
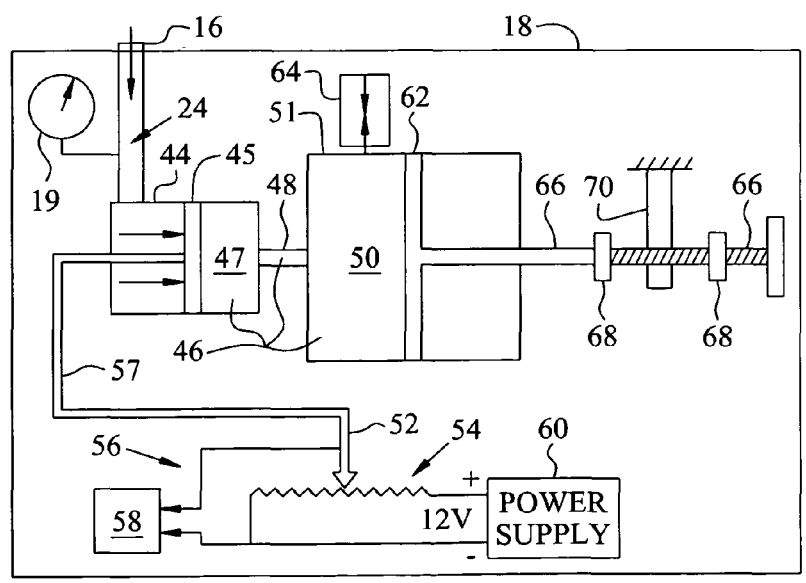
FIG. 4 is a schematic representation of the constituents of the surface manifold assembly of the hydrostatic force/displacement measuring device of the invention.

Referring also to FIG. 4, surface manifold assembly 18 provides the mechanism for collecting dynamic characterization data from the transitional downward forces 11A created by transitional tire 11. Manifold assembly 18 also is capable of replicating the spring constant, or in other words, the combination of both the required force and amount of displacement needed to effect contact, or detonation of a particular trigger mechanism of a particular VOIED. As will be explained herein, surface manifold assembly 18 can replicate different trigger mechanisms associated with different VOIEDS when they might be used in different soil/aggregates being examined.

Surface manifold assembly 18 includes a tubular-shaped interface cylinder 44 connected to hose 16 to receive the representative hydrostatic pressurized liquid 24. Pressurized liquid 24 inside cylinder 44 axially displaces a piston 45 which in turn compresses compressible air or any other compressible gas 46 in interface chamber 47 on the other side of piston 45 inside of cylinder 44. The compressed air 46 is fed through a duct 48 extending from interface chamber 47 in cylinder 44 to an internal chamber 50 in a spring constant cylinder 51. Piston 45 of interface cylinder 44 is also mechanically coupled to displace the sliding contact 52 of a potentiometer 54 of an electronic sensor 56 via a mechanical linkage 57. This interconnection of electronic sensor 56 to piston 45 by linkage 57 provides an electrical signal readout 58 representative of the extent of displacement of piston 45 when it is displaced by the force and volume of pressurized liquid 24. A stabilized power supply 60 is coupled to electronic sensor 56 to maintain constant non-fluctuating current necessary for accurate output measurements.

Spring constant cylinder 51 establishes and maintains a representative spring constant force curve of distance and force required to initiate or detonate a particular pressure plate trigger mechanism. Spring constant cylinder 51 has compressible air 46 on one side of its axially displaceable spring piston 62. A Schrader valve 64 is provided in the wall of spring constant cylinder 51 to allow selective changing of the pressure of pressurized air 46 in internal chamber 50 as needed to replicate different triggering mechanisms.

For example, increasing the pressure of air 46 in chamber 50 via valve 64 has the effect of requiring a greater amount of pressure in pressurized liquid 24 (more force) to displace piston 45 to compress air 46 in interface chamber 47 and internal chamber 50 to equalize the pressures on both sides of piston 45. This greater amount of force correlates to a greater amount of force or pressure being required to be exerted by pressurized liquid 24 to detonate a trigger mechanism being simulated. On the other hand, if the pressure of air 46 in chamber 50 of spring constant cylinder 51 is decreased via valve 64, a lesser amount of pressure in pressurized liquid 24 will be needed to equalize the pressures on both sides of piston 45 in interface cylinder 44. This lesser amount of force correlates to a lesser amount of force or pressure being required to be exerted by pressurized liquid 24 to detonate a VOIED trigger mechanism threat being simulated.

Surface manifold assembly 18 can also replicate the amount of displacement required by a particular trigger mechanism. An axially extending shaft 66 of surface manifold assembly 18 has a pair of adjustable lock nuts 68 that can selectably engage shaft 66 at predetermined positions so that a fixed, structural guide 70 can restrict the amount of axial displacement of shaft 66 where it slides through fixed guide 70. Adjusting the locations of where lock nuts 68 engage shaft 66 creates a visually observable location that corresponds to a particular volume of internal chamber 50 that has been created in surface manifold assembly 18. This particular volume of internal chamber 50 correlates to a displacement distance needed to initiate detonation of a particular threat trigger mechanism being simulated in manifold assembly 18. Selectably increasing the size of internal chamber 50 (caused by withdrawing spring piston 62 to the right) will require additional displacement of piston 45 by increased volumes of pressurized liquid 24 from actuation assembly 14. This additional displacement of piston 45 equalizes the pressure of pressurized liquid 24 on one side of piston 45 in cylinder 44 to the pressure of gas 46 in interface chamber 47 on the other side of cylinder 44 to conform to the displacement required to initiate a particular trigger mechanism threat being simulated.

On the other hand, if the size of the internal chamber 50 in spring constant cylinder 51 is reduced, less displacement of spring piston 62 is required to initiate another, different trigger device mechanism being simulated. In other words, this relative displacement is representative of a displacement needed to initiate contact and detonation of a trigger mechanism threat being simulated. The observable extension of shaft 66 is an accurate measurement of the volume of air 46 inside internal chamber 50 at the predetermined amount of force that needs to be exerted to initiate a specific explosive trigger mechanism.

Hydrostatic force/measuring device 10 of the invention provides military planners a better understanding of the effectiveness of soil/aggregate interactions for responsive countermeasure determinations of threats in an operational environment. Hydrostatic force/measuring device 10 of the invention provides easily deployed, man portable means to record meaningful data associated with countering VOIEDS to allow a determination of the effectiveness of countermeasures in different operational environments. The disclosed components and their arrangements as disclosed herein, all contribute to the novel features of this invention. Therefore, hydrostatic force/measuring device 10 of the invention, as disclosed herein is not to be construed as limiting, but rather, is intended to be demonstrative of this inventive concept.

It should be readily understood that many modifications and variations of the present invention are possible within the purview of the claimed invention. It is to be understood that within the scope of the appended claims the invention may be practiced otherwise than as specifically described.

We claim:

1. An apparatus for measuring the force and displacement exerted by a rotating tire in soil/aggregate comprising:
   a hydrostatic actuation assembly having a pressure plate at near surface depths of soil/aggregate providing hydrostatic pressures in a liquid, said hydrostatic pressures being representative of force and displacement created by the downward forces exerted by a rotating tire in the soil/aggregate at the near surface depths;
   a hydrostatic hose connected to said hydrostatic actuation assembly for transmitting said hydrostatic pressure forces in said liquid; and
   a surface manifold assembly having a gauge coupled to said hydrostatic hose and providing visual readouts of said hydrostatic pressures, and an interface cylinder coupled to said hydrostatic hose and provided with an axially displaceable piston defining an interface chamber, said piston being connected to an electronic sensor to provide visual readouts representative of displacements caused by said downward forces at near surface depths in the soil/aggregate.

2. The apparatus of claim 1 wherein said surface manifold assembly further includes:
   a spring constant cylinder having an internal chamber coupled by a duct to said interface chamber and having an axially displaceable piston to define said internal chamber.

3. The apparatus of claim 2 wherein said spring constant cylinder further includes:
   a valve extending through said spring constant cylinder and into said internal chamber to selectively feed gas to and from said internal chamber to selectively increase and decrease the gas pressure therein.

4. The apparatus of claim 3 wherein said spring constant cylinder further includes:
   a shaft axially extending from said axially displaceable piston and a pair of lock members on said axially extending shaft to engage a fixed structural guide to selectably fix the volume of said internal chamber in said spring constant cylinder.

5. The apparatus of claim 4 wherein said electronic sensor includes a potentiometer having a sliding contact mechanically coupled to said axially displaceable piston to provide said visual readouts representative of displacements caused by the rotating tire.

6. The apparatus of claim 5 wherein said electronic sensor is coupled to a stabilized power supply to maintain constant non-fluctuating current for accurate output measurements.

7. The apparatus of claim 6 wherein said hydrostatic actuation assembly further includes:
   a plurality of pistons connected to said pressure plate and extending downward; and
   an actuation manifold having a base plate resting on soil/aggregate material, said actuation manifold being filled with said liquid and disposed between said pressure plate and said base plate.

8. The apparatus of claim 7 wherein said actuation manifold further includes:
   a plurality of hollow, essentially cylindrically-shaped members each having a manifold chamber and each provided with an upper open end and a lower open end, each separate manifold chamber being filled with said liquid and aligned with a separate one of said pistons;
   a latex lower member extending across the lower open ends of said hollow members to seal the junctures between said hollow members and said base plate; and
   a plurality of high-stretch high-abrasion latex upper members each being secured to and extending across the upper open end of a separate hollow member.

9. The apparatus of claim 8 wherein each of said latex upper members is aligned to be engaged by a separate one of said downwardly extending pistons to be responsibly displaced by a separate one of said pistons to create said hydrostatic pressures in said liquid in each of said hollow members.

10. The apparatus of claim 9 wherein said valve of said spring constant cylinder selectively enables the transfer of pressurized gas to and from said internal chamber of said surface manifold assembly and said lock members enable the selective engagement of said axially displaceable shaft of said spring constant cylinder to create a visual readout in said electronic sensor that corresponds to a distance of displacement of a predetermined trigger mechanism at the force indicated on said read-out gauge.

11. A hydrostatic force measuring device to measure the force and displacement exerted by a rotating tire in soil/aggregate comprising:
   a) a hydrostatic actuation assembly having
      i) a pressure plate having top and bottom sides,
      ii) a plurality of rigid plungers each having one end coupled to the bottom of said pressure plate,
      iii) a hollow, cylindrical member having top and bottom ends and defining a manifold chamber adjacent to an other end of each of said plungers,
      iv) a stretchable upper membrane coupled to and sealing the top end of each said cylindrical member and disposed against said other end of each said plunger,
      v) a stretchable lower membrane coupled to and sealing the bottom end of each said cylindrical member,
      vi) a plurality of tubular sections extending between said cylindrical members and interconnecting said manifold chambers,
      vii) a hydrostatic hose coupled to one of said manifold chambers, and
      viii) an incompressible liquid inside said manifold chambers and said hydrostatic hose for transmitting a force representative of the force and displacement exerted by the rotating tire on said pressure plate; and
   b) a surface manifold assembly having
      ix) a readout gauge coupled to said hydrostatic hose for displaying pressures in said hydrostatic hose,
      x) an interface cylinder coupled to said hydrostatic hose,
      xi) a displaceable piston inside said interface cylinder having one side in communication with said incompressible liquid and another side in communication with a compressible gas,
      xii) a spring constant cylinder having an internal chamber;
      xiii) a duct coupled to and communicating said compressible gas between said interface cylinder and said spring constant cylinder,
      xiv) an axially displaceable spring piston inside said spring constant cylinder having one side in communication with said compressible gas, and
      xv) a valve in fluid communication with said internal chamber of said spring constant cylinder for selectively changing the pressure of said compressible gas.

12. The device of claim 11, further comprising an electronic sensor with a potentiometer having a sliding contact mechanically coupled to said displaceable piston and an electrical signal readout displaying the extent of displacement of said displaceable piston.

13. The device of claim 12, further comprising:
   an axially extending shaft coupled to said spring piston and extending through said spring constant cylinder, said shaft having threads on its distal end;
   a fixed guide through which said distal end of said shaft extends; and
   lock nuts disposed on said distal end of said shaft on opposite sides of said fixed guide, said lock nuts being adjustable on said shaft to limit the travel of said spring piston.

14. The device of claim 11, wherein said hydrostatic actuation assembly is buried in soil/aggregate over which a vehicle can travel.

15. The device of claim 14, wherein said top side of said pressure plate is between 1 and 12 inches below the surface of the soil/aggregate.

* * * * *